July 3, 1923.

O. A. WIRKKALA

LOGGING BULL HOOK

Filed Aug. 10, 1922

1,460,808

Oscar A. Wirkkala,
INVENTOR.

BY David E. Bain,
ATTORNEY.

Patented July 3, 1923.

1,460,808

UNITED STATES PATENT OFFICE.

OSCAR A. WIRKKALA, OF KENT, WASHINGTON.

LOGGING BULL HOOK.

Application filed August 10, 1922. Serial No. 581,036.

*To all whom it may concern:*

Be it known that I, OSCAR A. WIRKKALA, a citizen of the United States and a resident of Kent, in the county of King and State of Washington, have invented a new and useful Logging Bull Hook, of which the following is a specification.

This invention relates to improvements in logging bull hooks, and one of the objects of the improvements is to provide a bull hook which will positively retain the knob end of a cable in engagement therewith, another object of my improvements is to provide a bull hook which will require little slack in the cable in order to be engaged therewith or disengaged therefrom, and a further object of my improvements is to provide a bull hook designed for casting in steel alloys and which is of simple and light though strong structure.

Figure 2:
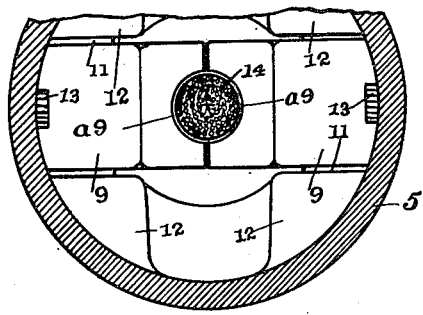
Figure 1:
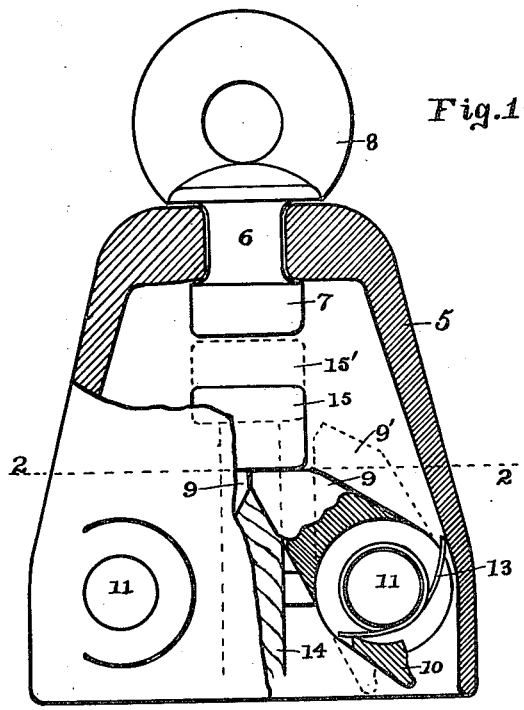
Figure 4:
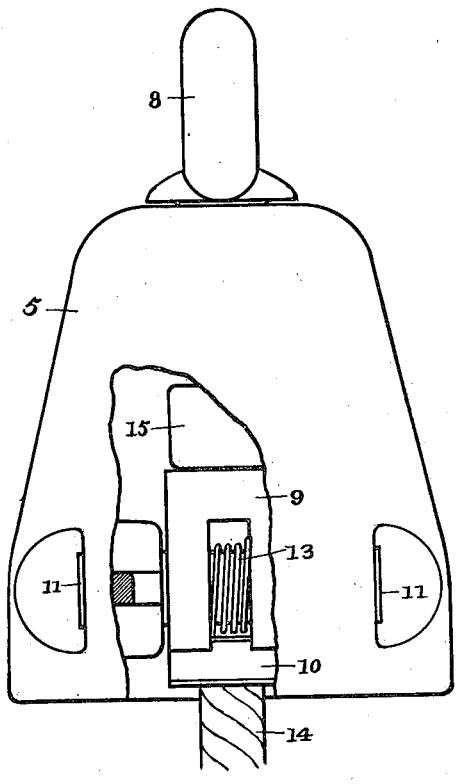
Figure 3:
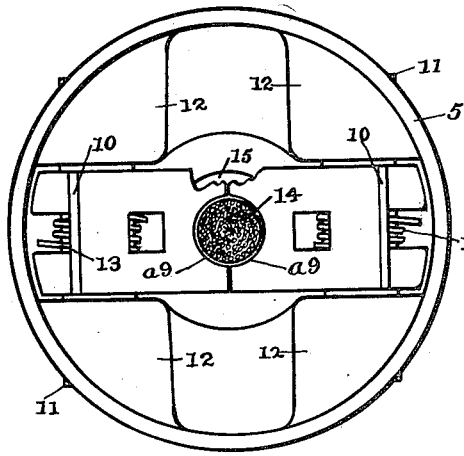

I attain these objects with the mechanism illustrated in the accompanying sheet of drawings in which Figure 1 is a front elevation of my bull hook partly in section on a medial, vertical plane, Fig. 2 is a top plan section of Fig. 1 on the line 2—2, Fig. 3 is a bottom plan view of Fig. 1, and Fig. 4 is a side elevation of Fig. 1.

Similar characters refer to similar parts throughout. Certain parts are broken away for lack of space or to show other parts hidden thereby.

More particularly: The main body of the hook is indicated by 5 and is, preferably, bell form. Centrally in the top of body 5 is a hole which provides a bearing for the shank 6 of the swivel having head 7 and eye 8 adapted to engage with a hauling cable. Two dogs, 9, 9, each having a finger hold 10, are pivoted on parallel pins 11, 11, which are mounted in holes in four body lugs 12. Pins 11 are equidistant from a longitudinal medial line through swivel 6 and hook body 5 and transverse therewith. When in their illustrated full-line positions the free ends of dogs 9 are above pins 11, further within the hook body, and meet in the said medial hook-body line. Each of said dogs has a semi-circular groove $a^9$ in its free end, and together these grooves form a hole for choker cable 14 when the latter is in operative position in said hook. A coil spring 13 is mounted on each of pins 11 with ends bearing on the hook body and dog to cause the springs to react and force said dogs toward each other. These springs operate to retain the dogs in their illustrated full-line positions till forced apart in oscillation on the pins by pressure sufficient to overpower the springs. Choker cable 14, only one end of which is shown, has knob 15 fastened to its end adapted to bear on the ends of dogs 9 when the cable is enclosed thereby.

This bull hook is well adapted to engage with the knobbed end of any cable, but is particularly designed to engage with choker cables. The log hauling line is fastened in eye 8. The choker cable is engaged with the hook by introducing it, knob first, into the bottom of the hook body where said knob will force dogs 9, 9 apart and pass within as far as swivel head 7. At this place the knob is free from the dogs, which return to their full-line positions, when the cable is withdrawn till said knob is seated on the ends of the dogs, and the cable is properly engaged in the hook. To remove the cable from the hook slack is provided in the cable to permit knob 15 to pass to its dotted-line position at 15′ when dogs 9, 9 are forced apart by hand pressure on lugs 10, 10 sufficiently to permit the knob to pass out between them.

The form of swivel illustrated is designed for casting in place and is the subject of two applications which I have made for patents, Serial Nos. 570,630 and 571,283, filed June 24, 1922, and June 27, 1922, respectively.

Having thus disclosed my invention, what I claim is new and desire to secure by Letters Patent, is,—

1. In a bull hook in combination, a hook body, and a pair of dogs mounted for oscillation on bearings in said hook body adapted for the passage of a knobbed cable between them and further adapted to have their free ends bear on each other on one side of a line drawn through said mounted ends.

2. In a bull hook in combination, a hook body, a swivelling cable fastening mounted for revolution in one end of said body, and a pair of dogs mounted for oscillation on bearings in said body adapted for the passage of a knobbed cable between them and further adapted to have their free ends bear on each other between their mounted ends and said swivel.

3. In a bull hook in combination, a hook body, a swivelling cable fastening mounted for revolution in one end of said body, a pair of dogs mounted for oscillation in bearings in said body adapted for the passage of a knobbed cable between them and further adapted to have their free ends bear on each other between their mounted ends and said swivel, and resilient means adapted to force said dogs in rotation toward each other.

4. In a bull hook in combination, a hollow bell-form hook body, a swivelling eye engaged in the closed end of said body engageable with a hauling cable and revolvable on the longitudinal central axis of said body, and a pair of dogs mounted for oscillation within said body on parallel pins in said body, said pins transversely of and equidistant from said central body axis, said dogs adapted for the passage of a knobbed cable between them and further adapted to have their free ends bear on each other between said pins and said swivel whereby is provided a seat on said ends for a cable knob.

5. In a log-hauling-rigging device in combination, a hollow bell-form hook body, a swivel engaged in the closed end of said body engageable with a hauling cable and revolvable on the longitudinal central axis of said hook body, a pair of dogs mounted for oscillation within said body on parallel pins in said body, said pins transversely of and equidistant from said central axis, said dogs adapted for the passage of the knobbed end of a cable between them and also adapted to have their free ends bear on each other while between said pins and said swivel whereby said knob may bear thereon, and a knobbed cable end adapted to enter said hook body and pass between said dogs and beyond the same between said swivel and said dogs to bear on the free ends of said dogs when said free ends are juxtaposed and said cable is therebetween.

OSCAR A. WIRKKALA.